United States Patent [19]
Serritella

[11] 3,831,847
[45] Aug. 27, 1974

[54] MAGNETIC VEHICLE BUMPER

[76] Inventor: Daniel J. Serritella, 7757 S. Narrangansett, Burbank, Ill. 60459

[22] Filed: Apr. 30, 1973

[21] Appl. No.: 355,339

[52] U.S. Cl................ 239/1, 293/71 R, 293/DIG. 6
[51] Int. Cl............................................ B60r 19/02
[58] Field of Search............ 293/1, 70, 71 R, DIG. 6

[56] References Cited
UNITED STATES PATENTS
2,540,216　2/1951　Quinby ............................. 293/1 X
3,147,176　9/1964　Haslam .......................... 293/DIG. 6

Primary Examiner—Lloyd L. King
Assistant Examiner—Andres Kashnikow

[57] ABSTRACT

A vehicle bumper consisting of a pair of bracket members adapted for mounting on the chassis of a vehicle in the conventional bumper location thereon, a rigid channel member adapted for mounting on a bracket in a manner to extend transversely of the vehicle with the rear surface of the channel member adjacent the vehicle body and the front surface of the channel member projecting away from the vehicle body, a segmented magnetic member extending longitudinally across the front surface of the channel member with each of the magnetic segments having the same magnetic pole face portion facing in a forward direction substantially flush with the front surface of the channel member, and a cover adapted for slipping over the magnetic members and channel member and secured thereover by bolts or the like in a manner to protect the channel and magnetic members.

5 Claims, 4 Drawing Figures

PATENTED AUG 27 1974　　　　　　　　　　　　　　3,831,847
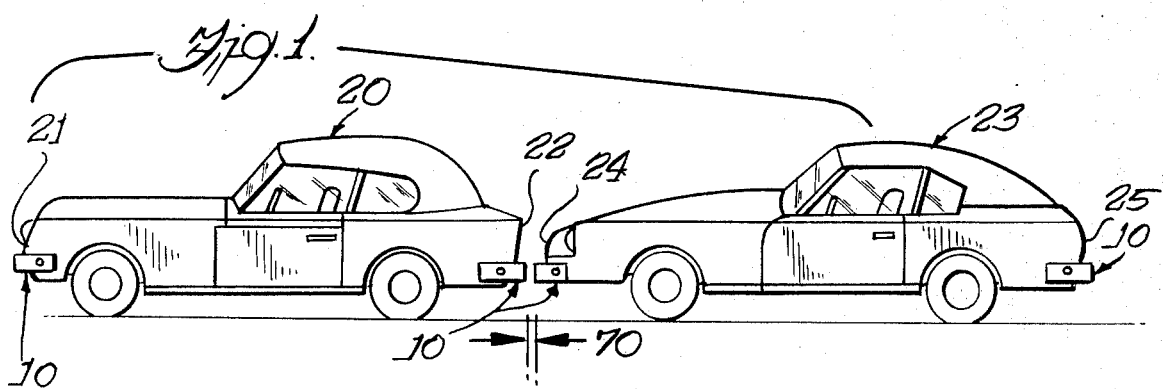
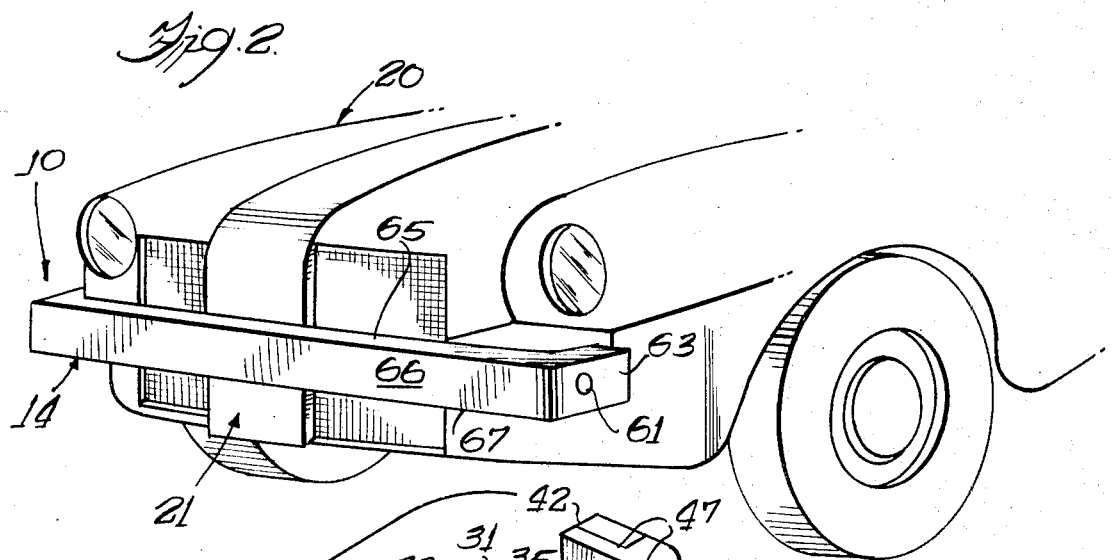
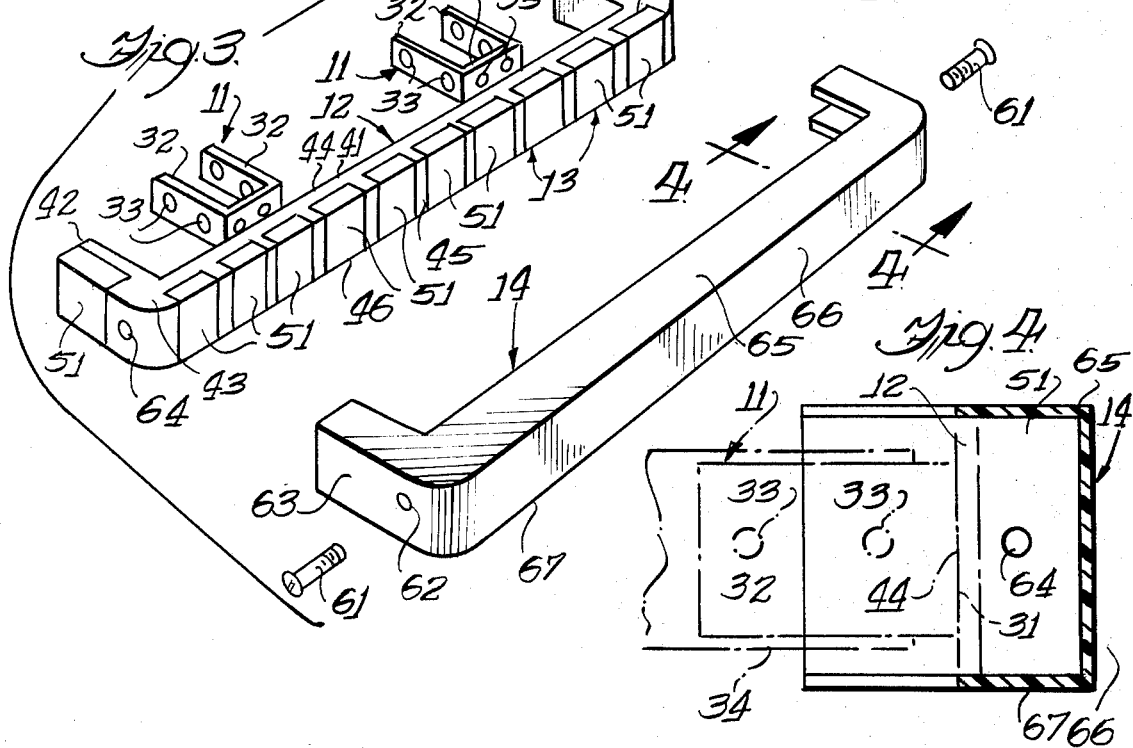

3,831,847

MAGNETIC VEHICLE BUMPER

BACKGROUND OF THE INVENTION

1. Field of the Invention

This invention relates generally to vehicles and the like and more particularly to a novel and improved magnetic bumper construction which will provide increased safety to passengers as well as to the vehicle body in the event of collision with other vehicles or the like.

2. Description of the Prior Art

There have long been in use bumper type devices on vehicles which consist of a rigid metal member extending transversely across both the front and rear of the vehicle and adapted for making the first engagement with other vehicles in the event of contact therewith, such as during normal driving, accidental collisions, parking of the vehicle, and the like. However, such conventional bumper constructions suffer many problems and difficulties in that they have failed to provide adequate protection for the safety of the passengers in the vehicle as well as failing to provide protection to the vehicle body in minor collisions.

Furthermore, such bumpers provide no protection to the vehicle if it is struck in the side during a collision such that conventional bumpers are more decorative than functional on present day vehicles.

Prior art conventional type bumper constructions thus suffer many problems and difficulties in attempting to be aesthetically pleasing to a vehicle purchaser while still attempting to provide some type of protection to a vehicle body and to passengers in the vehicle in the event of a collision, with such bumper construction types succeeding in becoming aesthetically pleasing but failing in their main purpose of being a protective safety device on a vehicle.

SUMMARY OF THE INVENTION

The present invention remedies and overcomes all of the foregoing deficiencies and disadvantages of presently available bumper constructions by providing a novel aesthetically pleasing bumper construction having a refined appearance and which includes a plurality of magnetic members adapted for repelling or attracting another vehicle at limited speeds in a manner to reduce costly and damaging collisions.

It is a feature of the present invention to provide a novel bumper construction which presents externally thereof a single magnetic pole, such as the North or South pole, such that upon approaching the rear or front of a vehicle equipped with a similar bumper the two like magnetic Poles of the respective bumpers will repel each other in a manner to exert a force therebetween to slow down the speed of approach between the vehicles thereby either eliminating direct contact therebetween or, if the initial vehicle speeds are of an exceptionally high nature, to reduce the speeds therebetween prior to contact in order to reduce the force of the collision and the resultant damage caused thereby posed to the vehicle body and to the passengers in the vehicle.

Further, the present invention provides a novel bumper construction effective in side collisions between vehicles where the front of one vehicle encounters a side of another vehicle by acting to magnetically attract the side of the vehicle to the bumper, thereby effectively magnetically holding the side of the vehicle thereto in order to assist in preventing the side struck vehicle from rolling over onto its roof portion thus providing a long needed safety device to prevent the roll over tendency of vehicles struck in the side with the resultant injury and death to the passengers within the vehicle.

It is a feature of the present invention to provide a bumper construction formed of magnetic material which is readily adapted for mounting on vehicles of all makes and manufactures as a long needed safety device.

A further feature of the present invention provides a bumper construction having magnetic elements disposed thereon and mounted therein in a manner permitting ease of repair or replacement of one or more of the elements upon damage thereto without necessitating the costly replacement of the entire bumper.

Still a further feature of the present invention provides a bumper construction having an aesthetically pleasing cover member adapted for engagement thereover in a manner to provide both a decorative appearance to the bumper along with providing protection to the magnetic elements, the cover member being inexpensive and readily replaceable in order to maintain its aesthetically pleasing appearance should the same become marred or damaged in usage.

The provision of a magnetic bumper construction for vehicles, such as briefly outlined above, and possessing the stated advantages, constitutes the principal features of the present invention. The provision of a magnetic bumper construction which is relatively inexpensive to manufacture due to its simplicity of construction; one which is rugged and durable and which may therefore be guaranteed by the manufacturer to withstand rough usage; one which is aesthetically pleasing and refined in appearance; one which is adapted for use on various types of vehicles and the like; one which is easily attached to vehicles and the like; one which is extremely safe in operation; one which may, in its entirety, be manufactured and installed as part of the original equipment of the vehicle, or which may be attached to the vehicle later as an accessory item; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a side elevational view of a pair of vehicles equipped with the magnetic bumper according to the present invention;

FIG. 2 is a perspective view of the front of an automobile illustrating the bumper construction of the present invention attached thereto;

FIG. 3 is an exploded perspective view of the bumper construction of the present invention; and FIG. 4 is an enlarged cross-sectional side elevational view taken along Line 4—4 of FIG. 3.

DESCRIPTION OF THE PREFERRED EMBODIMENT

With reference to the drawings as hereinafter set forth in greater detail, it is to be understood that for purposes of convenience a conventional type automobile has been selected for illustration of the present invention, with it being understood that the present invention is adapted for use on vehicles of all makes, such as automobiles, trucks, and any other type of transportation vehicle to which the bumper construction of the present invention may be attached as either an integral feature or as an accesory feature.

Further, it is to be understood that the magnetic portion of the bumper is shown as a series of individual magnetic members, but it is envisioned that the single unitary magnetic member might similarly be provided rather than the individual segmented magnetic members, this being a provision within the scope of the present invention.

Referring now to the drawings in detail there is illustrated a preferred form of a magnetic bumper construction designated in its entirety by the reference numeral 10 which is comprised of four component parts, namely a pair of generally U-shaped bracket members 11, a rigid channel member 12 adapted for securement to the mounting brackets, a plurality of magnetic members 13 secured to the channel member, and a cover member 14 adapted for securement over the magentic members and channel member to provide an aesthetically pleasing and refined appearance to the bumper construction 10.

The channel member 12 may be manufactured out of any suitable satisfactory non-magnetic material, with the magnetic members 13 being manufactured out of any suitable material having magnetic retaining properties, such as alnico, barium ferrite, or similar magnetic materials. The cover member 14 is of a dispensable type for ready replacement upon marring or damage of the same in cases of collision, and may be made of any suitable inexpensive material, such as plastic and the like.

Referring to FIG. 1 there is seen a vehicle generally designated by reference numeral 20 having a bumper construction 10 embodying the principles of the present invention mounted both at the front end 21 and rear end 22 thereof, with a second vehicle generally designated by reference numeral 23 positioned rearwardly of vehicle 20 and having a bumper construction 10 mounted on the front end 24 and on the rear end 25 thereof. Further details of the mounting of the bumper 10 on front end 21 of vehicle 20 is seen in FIG. 2.

Referring now to FIG. 3 it is seen that the brackets 11 are each of a general U-shape having a base portion 31 with transversely spaced longitudinally extending parallel leg portions 32 extending rearwardly from opposite edges of the base portion, with mounting holes 33 formed in legs 32 and adapted for utilization in securing the bracket members 11 to a portion of the chassis 34 (FIG. 4) of the vehicle 20 by suitable bolts or the like (not shown) in a conventional manner. In addition, holes 35 are provided in base portion 31 to receive bolts (not shown) therethrough in a conventional manner to secure channel member 12 to the bracket members 11 in a manner extending transversely across the width of the vehicle 20.

The channel member 12 is illustrated as being of a generally elongated U-shape having a longitudinally extending body member 41 and opposed substantially parallel rearwardly extending leg portions 42 with it being understood that the channel member may consist of only the body member without the leg portions. The body member 41 extends for a length of about 5 feet, this being about the width of a standard sized vehicle 20 and measures approximately 4 inches thick by about 4 inches high. The body member 41 and side leg members 42 each include a top surface 43, a rear surface 44, a front surface 45, and a bottom surface 46. The front surface 45 has defined therealong a series of longitudinally spaced vertically extending compartments 47, with there being mounted in each compartment a magnetic member 51 each having the same magnetic Pole facing in a forward direction and disposed substantially flush with the front surface 45 of the channel member 12. Magnetic members 51 are mounted to channel member 12 in any conventional manner, such as by adhesives, bolting, snap type clip retainers, and the like, permitting repair or replacement of one or more of the individual magnetic members without affecting the remaining number of magnetic members.

Cover member 14 is a configuration sized and shaped complimentary to channel member 12 and is adapted to slip readily thereover and be secured thereto by bolts or pins 61 adapted to be inserted through holes 62 provided in opposed sides 63 of the cover member and received within holes 64 which are axially aligned with holes 62 upon cover member 14 being placed in the mounting position over channel member 12, the bolts or pins 61 being secured thereto by nuts or the like (not shown) in a conventional manner. As seen in FIG. 4 the cover member 14 is of a substantially uniform thickness throughout and includes a top surface 65, a front surface 66, and a bottom surface 67, the interior of surfaces 65–67 are disposed in juxtaposition with surfaces 43–46 respectively of channel member 12 when cover member 14 is mounted thereover.

Referring to FIG. 1, and as it is known that like magnetic poles repel each other, it is designated by reference numeral 70 the distance between vehicles 20 and 23 caused by the force of repulsion between adjacent bumpers 10. It is understood that the force of repulsion between the bumpers would depend on the magnetic strength of the bumper as determined by magnetic elements 51, the velocity of approach between the vehicles, the distance between the vehicles, and the like, with it being understood, however, that the magnetic bumper 10 will always act to minimize or avoid accidental collisions between vehicles in a manner to reduce costly and damaging collisions and assist in protecting the vehicle passengers from undue bodily harm.

Further, it is to be appreciated that should the front of a vehicle equipped with bumper 10 strike the side of another vehicle, the bumper would tend to magnetically attract the vehicle struck in the side and magnetically retain the same thereagainst rather than topple the struck vehicle or throw the struck vehicle therefrom into a dangerous situation, this thus aiding in preventing vehicle roll overs and the like normally encountered with vehicles not equipped with the present invention upon striking the side of another vehicle in a side collision.

It is to be understood that the form of this invention herewith shown and described is to be taken as preferred examples of the same, and that this invention is not to be limited to the exact arrangement or parts shown in the accompanying drawings or described in this specification as various changes in the details of construction as to shape, size, and arrangement of parts may be resorted to without departing from the spirit of the invention, the scope of the novel contents thereof, or the scope of the sub-joined claims.

I claim:

1. A vehicle bumper comprising:

bracket means adapted for mounting on a chassis of a vehicle in approximately the conventional bumper location on the vehicle;

a rigid longitudinally extending channel member having a top surface, a bottom surface, a front surface, and a rear surface and adapted for mounting on the bracket means transversely of the vehicle with the rear surface adjacent the vehicle body and the front surface projecting away from the vehicle body, the channel member being formed of a non-magnetic material;

a series of spaced recesses extending longitudinally along the front surface of the channel member defining a series of compartments therealong;

magnetic means mounted to the front surface of the channel member adapted for attracting or repelling other adjacent vehicle bodies or bumpers thereto or therefrom, the magnetic means consisting of a plurality of magnetic members each of a shape and size to be received in an associated one of the channel member compartments and each having a front face portion of the same magnetic pole facing forwardly of the compartment, the front face portions of each of the magnetic members substantially lying in a plane which is parallel to the front surface of the channel member;

means securing each magnetic member into its associated compartment such that any magnetic member may be readily repaired or replaced without necessitating the replacement of the entire vehicle bumper; and cover means for covering the magnetic means and a portion of the channel member in a manner protecting the same.

2. A vehicle bumper as claimed in claim 1 further characterized by the face portions of the magnetic members each substantially lying in a plane defined by the front surface of the channel member so as to be substantially flush therewith.

3. A vehicle bumper as claimed in claim 2 further characterized by the cover means comprising a cover member generally in the form of an elongated rectangular box of a size and shape complementary to the channel member and adapted to fit over both the magnetic members and the front, top and bottom surfaces of the channel member with the interior front surface of the cover member in substantial juxtaposition with the front surface of the channel member and front face portions of the magnetic members, the cover member being of a substantial uniform thickness throughout; and bolts or pins securing the cover member to the channel member.

4. A vehicle bumper as claimed in claim 3 further characterized by the bracket means comprising a pair of generally U-shaped mounting brackets, each mounting bracket having a body portion and spaced apart rearwardly extending leg portions, the leg portions adapted for mounting to the chassis of the vehicle, and the body portion adapted for engaging the back surface of the channel member and having means associated therewith, such as bolts and the like, for securing the channel member to the body member.

5. A vehicle bumper as claimed in claim 4 further characterized by the channel member extending longitudinally a distance of about 5 feet, this being about the width of the conventional automobile vehicle, and being of a height of about 4 to about 6 inches and a depth of about 2 to about 4 inches, which each of the magnetic members having a width of about 4 inches, a height of about 4 to about 6 inches, and depth of about 2 to about 4 inches.

* * * * *